United States Patent Office 3,413,312
Patented Nov. 26, 1968

3,413,312
PROCESS FOR PREPARING 2,3-DIHYDRO-PARA-DIOXIN
Rodney D. Moss, Indianapolis, Ind., and Janet N. Paige, Midland, Mich., assignors to The Dow Chemical Company, Midland, Mich., a corporation of Delaware
No Drawing. Filed May 26, 1966, Ser. No. 553,061
4 Claims. (Cl. 260—340.6)

The invention relates to a new and improved process for preparing 2,3-dihydro-para-dioxin. More particularly the present invention concerns the preparation of 2,3-dihydro-para-dioxin by the simultaneous dehydrogenation and dehaydration of diethylene glycol in the liquid phase.

The simultaneous dehydrogenation and dehydration of diethylene glycol to 2,3-dihydro-para-dioxin according to the process of the present invention can be achieved by contacting the glycol in the liquid phase with a copper-containing chromium dehydrogenation catalyst in the presence of a promoter selected from the group consisting of a aluminum oxide ($Al_2O_3$); alkali metal acid sulfates such as potassium acid sulfate ($KHSO_4$) and sodium acid sulfate ($NaHSO_4$); alkali metal pyrosulfates such as potassium pyrosulfate ($K_2S_2O_7$); and, calcium fluoride ($CaF_2$), and at a temperature above about 200° C. The reaction products are conveniently separate from the reaction mixture continuously and as formed by permitting the reaction products to distill overhead from the reaction mixture.

The catalysts employed in effecting the simultaneous dehydrogenation and dehydration of the diethylene glycol to 2,3-dihydro-para-dioxin according to the process of the present invention are the various copper-chromite catalysts containing from about 15 to about 80% by weight of copper and from about 10 to about 45% chromium. Representative of the commercially available catalysts which have been employed and found successful are Harshaw 0401P, 1402P, 1106P, 1800P, 1802P, 2000P, 0202P. These catalysts contain from 31.2% to 65.5% copper and from 11.6% to 41% chromium. The 1106P catalyst is a barium containing catalyst. The Girdler catalysts, all commercially available, which are effective are Girlder T-873A, T1113, T1136, T1060, all of which contain copper in the amount from 29% to 44% and chromium in the amount from 25% to 30%. The T873A catalyst is a barium containing copper chromite. Several procedures are reported in the literature for preparing copper chromites and these have been found satisfactory for the preparation of copper chromite catalysts useful in accordance with the present invention.

The promoters for the copper chromite catalysts described above which enhanced the yield of the desired dioxin product when employed in accordance with the present invention are the alkali metal acid salts of sulfuric acid, the alkali metal pyrosulfates, calcium fluoride and aluminum oxide. The copper chromite promoted catalyst which when employed in accordance with the present invention yields the improved results is one having from about 10 to about 60 percent by weight promoter based on the total weight of the copper chromite and promoter. The amount of activated catalyst which effectively converts the glycol to the dioxin is from about 0.1 gram of catalyst per mole of glycol and preferably about 0.5 to 4.5 grams of catalyst per mole of glycol. Amounts greater than 4.5 grams can be employed but normally do not increase the conversion sufficiently to warrant its use.

The simultaneous dehaydrogenation and dehydration of the diethylene glycol to produce the corresponding dioxin according to the process of the present invention can be conveniently effected at temperatures ranging from about 200° C. to about 300° C., and preferably from about 235° C. to about 250° C.

Atmospheric pressure is usually employed in carrying out the proces of the preent invention. However, pressures both above and below atmospheric pressure can also be employed.

The following examples are set forth for purposes of illustration but are not to be construed as limiting the invention in any manner.

Example 1

Copper chromite (15 g. of Harshaw 1800P), potassium acid sulfate (10 g.) and diethylene glycol (1060 g.≅10 moles) were placed in a 3-necked, 2 liter flask equipped with a stirrer. The flask was connected to a vacuum-jacketed Vigreaux column. After the entire system had been purged with nitrogen, the mixture was heated with stirring. When the pot temperature reached 235°, the products began to distill; steady hydrogen evolution started shortly before liquid began to distill. A reflux ratio of 3:1 was used; the head temperature was about 125° After 12 hours of distillation, the reaction was complete (i.e., hydrozen evolution cease and nothing more distilled). The distilled product was analyzed, the dimethyl glycol was recovered from the residue. Results (based on VPC analyses): Conversion was 36.5% with 86.5% yield of 2,3-dihydro-p-dioxin.

Example 2

In the manner of Example 1 employing 15 grams of various commercial copper-chromite catalysts and 10 grams of potassium acid sulfate as the promoter, and the same 10 mole reaction series, the following yields of 2,3-dihydro-p-dioxin were obtained.

| Catalyst Percent Cu; Percent Cr. | Percent Conv. | Percent Yield |
|---|---|---|
| Harshaw 0202P, 65.5; 11.6 | 44.5 | 87.0 |
| Harchaw 1800P, 40.8; 32.2 | 36.5 | 86.5 |
| Harshaw 1802P (more porous form of 1800P) | 34.5 | 71.5 |
| Harshaw 2000P, 43.2; 28.1 | 32.5 | 84.5 |
| Harshaw 0401P, 32.8; 30.0, Contg. Ba | 34.0 | 80.5 |
| Harshaw 1402P, 32.0; 41.0 | 41.0 | 76.5 |
| Harshaw 1106P, 31.2; 29.8, Contg. Ba | 30.0 | 77.0 |
| Girdler T-1060, 35.8; 28.7 | 35.5 | 81.5 |
| Girdler T-873A, 31.8; 27.4, Contg. Ba | 45.0 | 70.5 |
| Girdler T-1136, 29.0; 25.0, Contg. Ba | 38.0 | 72.5 |
| Girdler T-1113, 44.0; 30.0 | 39.0 | 66.5 |

Example 3

In the manner of Example 1 employing two different commercial copper chromite catalysts in various amounts with various amounts of potassium acid sulfate, the following yields of dioxene were obtained when a series of 10 mole reactions was run.

| g. Catalyst: | g. $KHSO_4$ | Percent Conv. | Percent Yield |
|---|---|---|---|
| Catalyst; | | | |
| 1800P; 15 | 10 | 35.0 | 85.5 |
| 1800P; 22.5 | 10 | 42.0 | 77.5 |
| 1800P; 30 | 10 | 47.5 | 75.0 |
| 1800P; 45 | 10 | 60.0 | 77.5 |
| 1800P; 30 | 20 | 31.0 | 62.5 |
| 1800P; 15 | 5 | 57.5 | 79.2 |
| 1800P; 15 | 2.5 | 68.0 | 58.5 |
| 0202P; 15 | 10 | 44.5 | 87.0 |
| 0202P; 15 | 15 | 37.0 | 80.5 |
| 0202P; 15 | 5 | 65.8 | 78.5 |

We claim:
1. A process for producing 2,3-dihydro-para-dioxin having the formula

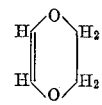

which comprises contacting, at a temperature above about 200° C., diethylene glycol in the liquid phase with a copper chromite catalyst having from about 15% to about 80% by weight of copper and from about 10% to about 45% by weight chromium, each based upon the total weight of catalyst, and a promoter for said catalyst selected from the group consisting of alkali metal acid sulfate, alkali metal pyrosulfate, calcium fluoride and aluminum oxide, said promoter being present in from about 10 to about 60% by weight based on the total weight of catalyst and promoter, said catalyst being employed in amounts of from about 0.1 gram to about 4.5 grams per mole of glycol.

2. The process of claim 1 wherein said promoter is potassium acid sulfate, and said catalyst including the promoters is employed in from about 0.1 to 4.5 grams per mole of glycol.

3. The process of claim 2 wherein said temperature is between about 235° C. and 250° C.

4. In the process of claim 2 wherein said process is carried out at ambient pressure.

References Cited

UNITED STATES PATENTS 3,149,130  9/1964  Guest et al. _____ 260—340.6

OTHER REFERENCES

Summerbell et al.: "Journal of Organic Chemistry," vol. 27 (1962) pp. 4433–6.

NICHOLAS S. RIZZO, *Primary Examiner.*

J. H. TURNIPSEED, *Assistant Examiner.*